(12) United States Patent
Schlipf et al.

(10) Patent No.: US 11,192,624 B2
(45) Date of Patent: Dec. 7, 2021

(54) AEROFOIL STRUCTURE AND METHOD OF ASSEMBLY

(71) Applicants: Airbus Operations GmbH, Hamburg (DE); Airbus Operations Limited, Bristol (GB)

(72) Inventors: Bernhard Schlipf, Hamburg (DE); Florian Lorenz, Hamburg (DE); German Ibanez-Gil, Portishead (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 323 days.

(21) Appl. No.: 16/022,889

(22) Filed: Jun. 29, 2018

(65) Prior Publication Data

US 2019/0002079 A1    Jan. 3, 2019

(30) Foreign Application Priority Data

Jun. 29, 2017   (GB) ...................................... 1710385

(51) Int. Cl.
| | |
|---|---|
| *B64C 3/26* | (2006.01) |
| *B64C 3/28* | (2006.01) |
| *B64C 3/18* | (2006.01) |

(52) U.S. Cl.
CPC ............... *B64C 3/26* (2013.01); *B64C 3/185* (2013.01); *B64C 3/187* (2013.01); *B64C 3/28* (2013.01)

(58) Field of Classification Search
CPC .. B64C 3/26; B64C 3/28; B64C 3/185; B64C 3/187; B64C 5/10; B64C 9/02
See application file for complete search history.

(56) References Cited

U.S. PATENT DOCUMENTS

| | | | | |
|---|---|---|---|---|
| 2012/0049007 A1* | 3/2012 | Hunter | ................... | B64C 23/069 244/199.4 |
| 2012/0112005 A1* | 5/2012 | Chaussee | ............... | B64C 23/072 244/123.1 |
| 2013/0026295 A1* | 1/2013 | Schlipf | ...................... | B64C 3/28 244/123.7 |
| 2013/0336795 A1* | 12/2013 | Parker | ................... | B64C 23/072 416/204 R |
| 2016/0244143 A1* | 8/2016 | Foster | ....................... | B64F 5/10 |
| 2018/0022439 A1* | 1/2018 | Stanley | ...................... | B64C 3/36 244/171.7 |
| 2018/0155004 A1* | 6/2018 | Woolcock | ............... | B64C 3/185 |
| 2019/0233081 A1* | 8/2019 | Budnitsky | ................. | B64C 9/16 |

FOREIGN PATENT DOCUMENTS

CA              711625            6/1965

OTHER PUBLICATIONS

GB Search Report, dated Dec. 15, 2017, priority document.

* cited by examiner

*Primary Examiner* — Philip J Bonzell
*Assistant Examiner* — Tye William Abell
(74) *Attorney, Agent, or Firm* — Greer, Burns & Crain, Ltd.

(57) ABSTRACT

An airfoil structure comprising a torsion-box member with a cover and a spar web connected by at least one pivot joint to a leading-edge or trailing-edge member, wherein the pivot joint is configured to permit rotation of the leading-edge member, or trailing-edge member, relative to the torsion-box member between an installation position and an operational position.

19 Claims, 8 Drawing Sheets

AEROFOIL STRUCTURE AND METHOD OF ASSEMBLY

CROSS-REFERENCES TO RELATED APPLICATIONS

This application claims the benefit of the Great Britain patent application No. 1710385.4 filed on Jun. 29, 2017, the entire disclosures of which are incorporated herein by way of reference.

FIELD OF TECHNOLOGY

The present invention relates to an airfoil structure for an aircraft and a method of assembly of an airfoil structure.

BACKGROUND OF THE INVENTION

Airfoil structures that are found in a variety of aircraft, spacecraft and wind turbine applications typically comprise a torsion-box structural member, attached to a leading-edge structural member and a trailing-edge structural member. When a torsion box is applied to airfoil structures such as aircraft wings and stabilizers, it is often referred to as a "wing box." A wing-box construction commonly used in commercial airliners includes a front spar member, a rear spar member, an upper cover member extending between the front spar member and the rear spar member, and a lower cover member extending between the front spar member and the rear spar member. One or more wing-box ribs may also be included between the spars and covers. Each of the front and rear spar members may be formed as a C-section with upper and lower flanges extending from an upstanding web. During assembly of the wing box, the upper and lower wing covers are usually attached to the flanges of the front and rear spar members. Fixed leading and trailing-edge structural members such as the leading-edge D-nose (as opposed to moveable structures such as slat or flap devices), are then attached to the wing-box by buttstraps attached to overhanging edges of the upper and lower cover members and/or attached to an upstanding web of each spar member.

The overall shape of fixed assembly must conform to a predefined shape as it is an airfoil structure. Any misalignment of various members may result in a shape deviation, which when operated in an aerodynamic flow might result in unintended performance and handling qualities of the airfoil structure. Therefore, the exact final position of the various members relative to one another in the assembled product (i.e., when fixed in an operational position) is of critical importance throughout the assembly process. Variations in each member's dimensions from an engineering ideal (normally governed by manufacturing drawings) must be controlled within pre-determined angular and linear dimension limits. These limits are commonly referred to as engineering tolerances. The tolerances are estimated during the design of the airfoil structure taking into account the type of material and the manufacturing processes used for the various members. Deviations to tolerances are sometimes referred to as tolerance gaps. Rectification of tolerance gaps is normally required between the mating surfaces of the various members, which are difficult to access once the components are held in an installed position. Frequently this occurs in the position of the buttstraps, which then requires either partial or full structural disassembly of the airfoil structure, followed by the addition and/or removal of predetermined amounts of material from the out-of-tolerance members concerned. Normally the addition and/or removal is achieved through use of use of solid or liquid structural shims (also known as compensators) and/or component fettling. Component fettling may result in the members becoming non-standard parts. The processes to rectify tolerance gaps are therefore extremely time consuming and are a significant factor that affects the rate at which finished airfoil structures can be economically produced. It has therefore been proposed to remove buttstrap member attachment of leading-edge and/or trailing-edge structural members to prevent tolerance gaps in these areas. It is also proposed to introduce the use of modular leading-edge and/or trailing-edge members to the wing-box member in order to decrease the time overall required to assemble airfoil structures. An airfoil structure design that enables a more efficient assembly process as well as optimizing the position where tolerance gaps can be rectified is therefore desirable.

SUMMARY OF THE INVENTION

An embodiment of the present invention provides an airfoil structure comprising a torsion-box member with a cover and a spar web connected by at least one pivot joint to a leading-edge or trailing-edge member, wherein the pivot joint is configured to permit rotation of the leading-edge member, or trailing-edge member, relative to the torsion-box member between an installation position and an operational position.

A further embodiment of the present invention provides an airfoil structure wherein the pivot joint comprises a pivot axis that is substantially parallel to a major axis of the spar web.

Another embodiment of the present invention provides an airfoil structure wherein the pivot joint comprises a pivot axis that is substantially parallel to a minor axis of the spar web.

A further embodiment of the present invention provides an airfoil structure wherein the pivot joint comprises a clevis, a corresponding tang, and a pin.

Another embodiment of the present invention provides an airfoil structure wherein the pivot joint further comprises compression means configured to compress the clevis and tang such that the leading-edge member, or trailing-edge member, can be prevented from pivoting relative to the torsion-box member away from the operational position.

A further embodiment of the present invention provides an airfoil structure wherein the pivot joint further comprises a linear compensator to compensate for a linear tolerance gap between the torsion-box member and the leading-edge member or trailing-edge member at the pivot joint.

A further embodiment of the present invention provides an airfoil structure wherein the pivot joint further comprises an angular compensator configured to compensate for an angular tolerance gap between the torsion-box member and the leading-edge member or trailing-edge member at the pivot joint.

Another embodiment of the present invention provides an airfoil structure wherein the angular compensator comprises a spherical bearing.

A further embodiment of the present invention provides an airfoil structure wherein the angular compensator comprises one or more spherical washers.

Another embodiment of the present invention provides an airfoil structure further comprising a connection member that is configured to connect the leading-edge member or the trailing-edge member, to the torsion-box member such that the connecting member prevents the leading-edge member, or trailing-edge member, from pivoting relative to the torsion-box member away from the operational position.

A further embodiment of the present invention provides an airfoil structure wherein at least one end of the connection member is configured to connect to the leading-edge member or the trailing-edge member or the torsion-box member using a lap joint.

Another embodiment of the present invention provides an airfoil structure wherein at least one end of the connection member is configured to hingedly connect to the leading-edge member or trailing-edge member or the torsion-box member.

A further embodiment of the present invention provides an airfoil structure wherein the length of the connection member is configured to be adjustable such that rotation of the leading-edge member, or trailing-edge member, relative to the torsion-box member can be adjusted to compensate for a tolerance gap.

Another embodiment of the present invention provides an airfoil structure further comprising an interchangeable aerodynamic panel positioned between the lower surfaces of the leading-edge member and the wing-box member.

A further embodiment of the present invention provides an airfoil structure wherein the interchangeable aerodynamic panel is removably attached to a connection member.

A further embodiment of the present invention provides an aircraft comprising an airfoil structure according to any of the embodiments so far described.

Another embodiment of the present invention provides a method of assembling an airfoil structure, the method comprising the steps of providing a torsion-box member comprising a spar web and a cover panel, providing a leading-edge member or trailing-edge member, positioning the leading-edge member or trailing-edge member at an installation position adjacent to the torsion-box member at the location of a pivot joint; connecting the leading-edge member or trailing-edge member to the torsion-box member at the pivotal joint; rotating the leading-edge member or trailing-edge member about the pivot joint to an operational position; and, fixing the leading-edge member or trailing-edge member in the operational position.

A further embodiment of the present invention provides a method according to the previous paragraph further comprising the steps of providing a connection member; and, fixedly connecting the connection member to the leading-edge member, or the trailing-edge member, and the torsion-box member so as to prevent the leading-edge member, or trailing-edge member, from pivoting relative to the torsion-box member away from the operational position.

Another embodiment of the present invention provides the method according to the previous paragraph further comprising the steps of rotating the leading-edge member, or trailing-edge member, relative to the torsion-box member by adjusting the length of the connection member in order to compensate for a tolerance gap.

Advantages of the present invention will now become apparent from the detailed description with appropriate reference to the accompanying drawings.

BRIEF DESCRIPTION OF THE DRAWINGS

Embodiments of the invention will now be described, by way of example only, with reference to the following drawings in which.

DETAILED DESCRIPTION OF THE PREFERRED EMBODIMENTS

Figure 1:
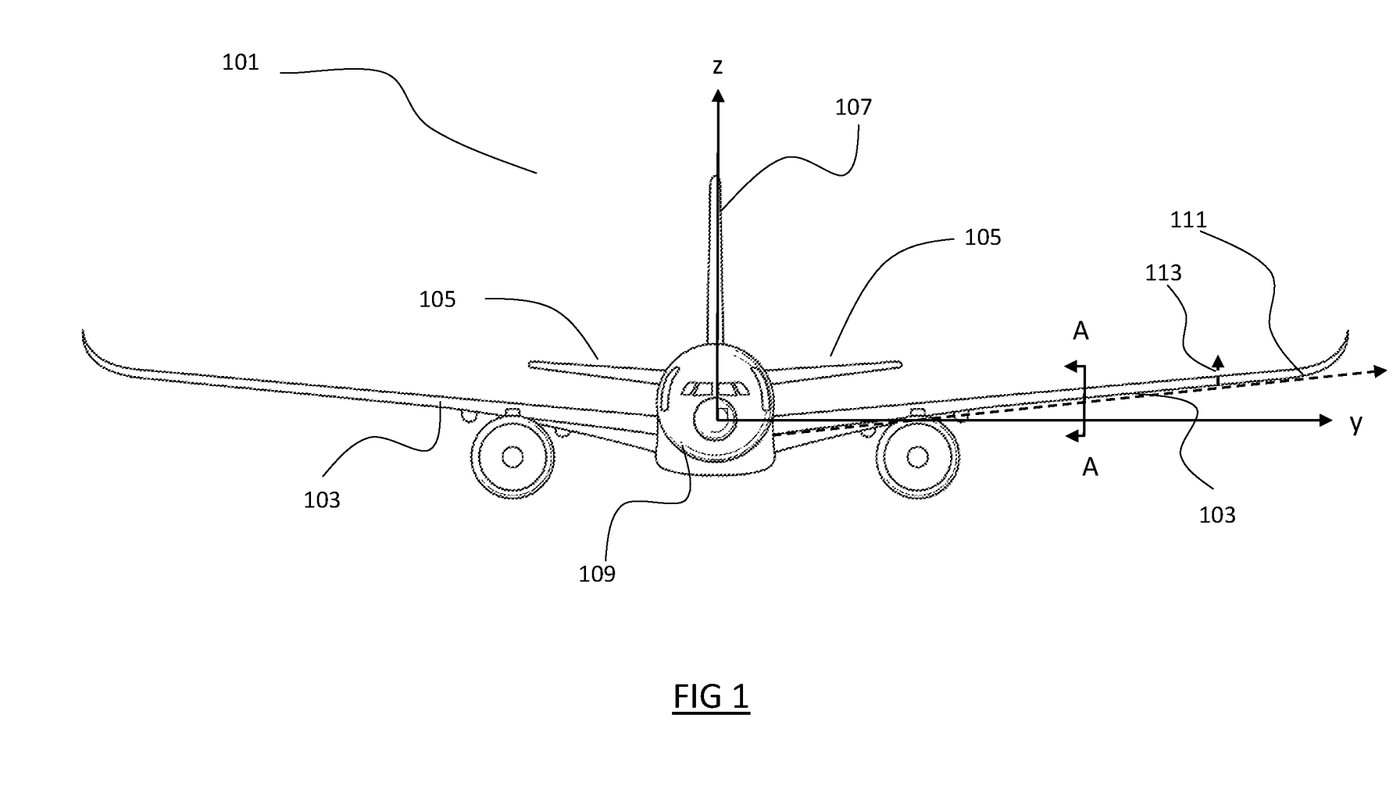
FIG. 1 shows a frontal schematic view of an aircraft in an operational state.

With reference to FIG. 1, an aircraft 101 is shown with an airfoil structure 103 (also referred to as a wing) extending through approximately horizontally a fuselage 109. A further airfoil structure 105 (also referred to as the horizontal tail plane) extends approximately horizontally from either side of a rear portion of the fuselage 109. Yet a further airfoil structure 107 (also known as the vertical tail plane) extends vertically from an upper rear portion of the fuselage 109.

The aircraft 101 has a set of orthogonal aircraft axes. The longitudinal axis (x) has its origin at the center of gravity of the aircraft 101 and extends lengthwise through the fuselage 109 from the nose to the tail in the normal direction of flight. The lateral axis or spanwise axis (y) also has its origin at the center of gravity and extends substantially crosswise from wingtip to wing tip. The vertical or normal axis (z) also has its origin at the center of gravity and passes vertically through the center of gravity. A further pair of orthogonal axes is defined for the airfoil structure 103; a first axis 111 that defined by a major dimension of a leading-edge spar web 317 (see FIG. 3), and an orthogonal second axis 113 defined by a minor dimension of the leading-edge spar web 317.

Figure 2:
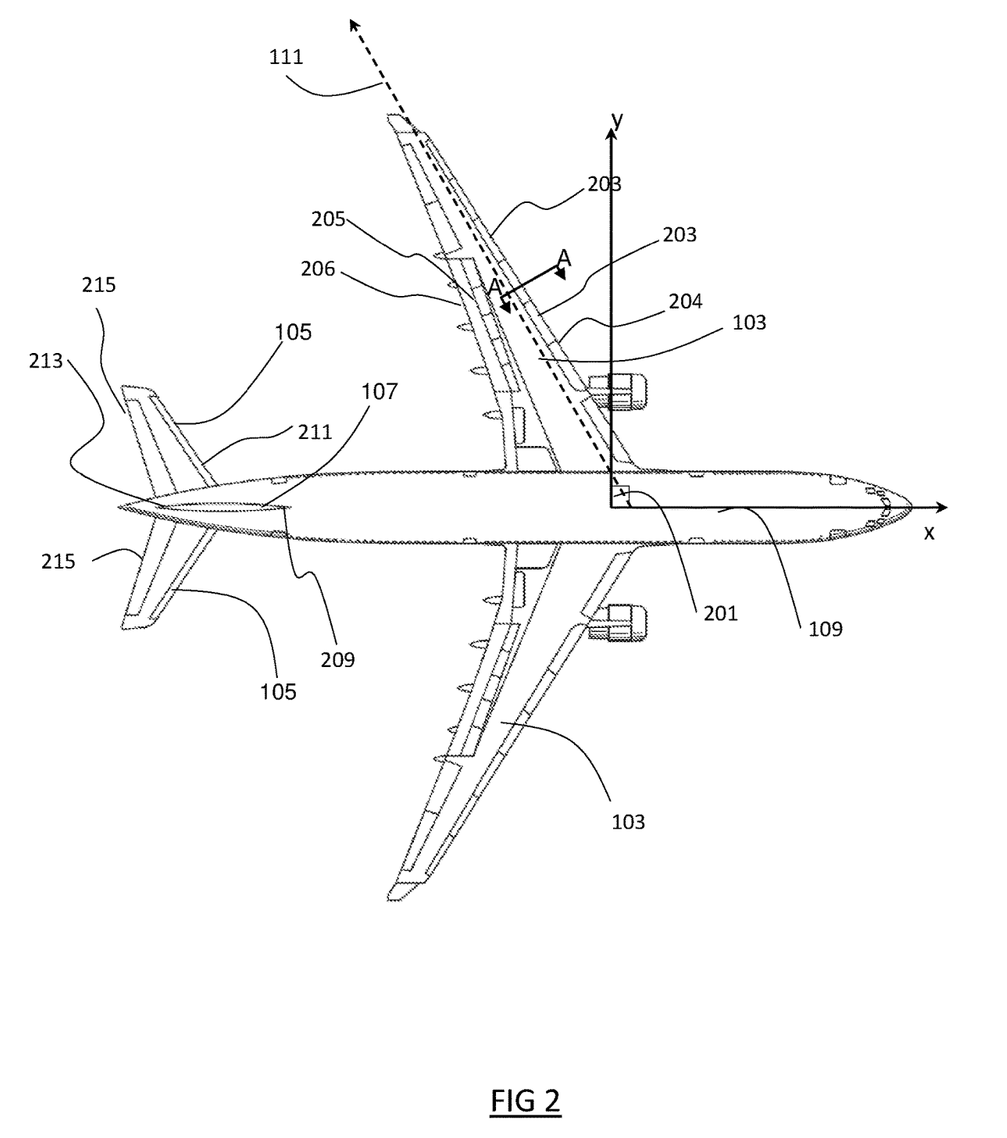
FIG. 2 shows a top schematic view of the aircraft of FIG. 1.

With reference to FIG. 2, the airfoil structure 103 comprises a set of high-lift devices called leading-edge slats 203, which are mechanically connected to it at the leading-edge region 204. The airfoil structure 103 also comprises a set of high-lift devices called trailing-edge flaps 205, which are mechanically connected to it at the trailing-edge region 206. The slats 203 and flap 205 are moveable (i.e., non-fixed)

devices, being actuatable during operation between a fully deployed position and a fully retracted position according to the inputs of a pilot. The purpose of the slats 203 and flaps 205 is to increase the camber and chord length and overall surface area of the wing 103 when deployed, thereby increasing the coefficient of lift that the wing 103 produces when required for slow flight of the aircraft 101. Adjacent to each slat 203 or flap 205 and/or in the areas where no high-lift devices are provided, the leading-edge and trailing-edge structure of the airfoil structure 103 is fixed, i.e., not configured to be moveable like the slats 203 and flaps 205 during operation of the aircraft 101. Similarly, the vertical tail plane 107 and the horizontal tail plane 105 each comprise their own respective leading edges 209, 211, trailing edges 213, 215 and fixed structure.

Figure 3:
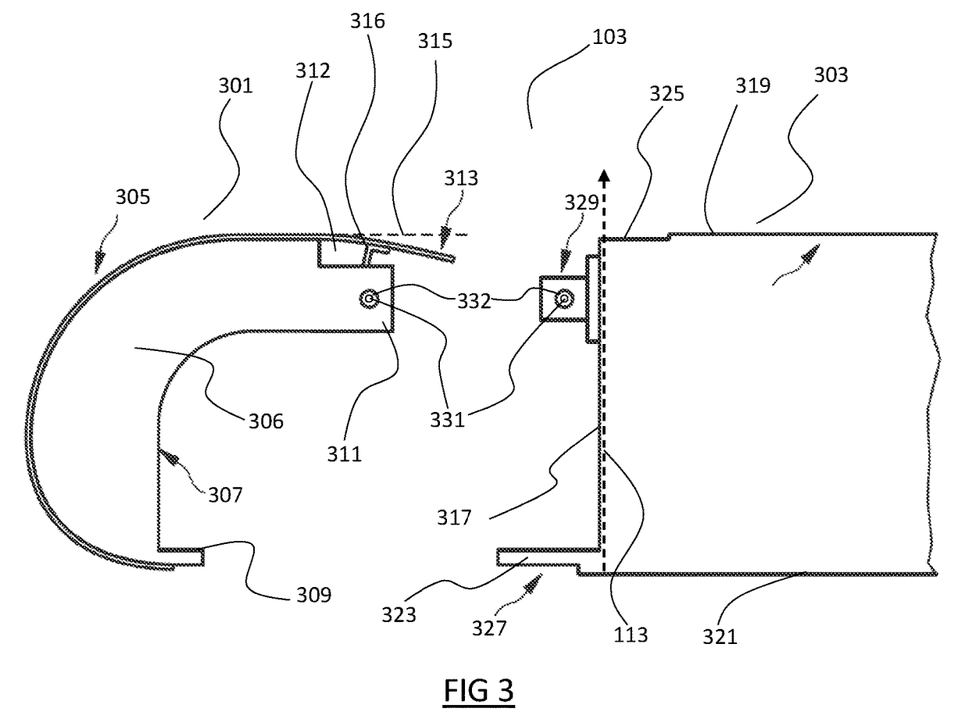
FIG. 3 shows a schematic section view of the airfoil structure of FIGS. 1 and 2, taken through line A-A with a modular leading-edge member 301 and wing-box member 303 held in an installation position.

With reference to FIG. 3, a section view A-A (from FIG. 2) of the airfoil structure 103 in the leading-edge region 204 is shown in an installation state that corresponds to an embodiment of the present invention. It should be appreciated that a similar view for the trailing edge would be substantially the same except reversed and comprising a different aerodynamic shape. The leading-edge structure is provided as a modular assembly, that is, a unitary preassembled structural module called a modular leading-edge member 301. The modular leading-edge member 301 may also be pre-equipped with systems and/or actuation elements of the slats 203. The use of pre-assembled unitary modules is desirable at this installation stage as it allows tolerance gaps to be controlled between a reduced number of components, which reduces the time overall required to assemble the airfoil structure 103. It should be appreciated that the same advantages would apply to a modular trailing-edge member.

The modular leading-edge member 301 is held in an installation jig separately from a wing-box member 303 (not shown). The wing-box member 303 can also be referred to as a torsion-box member. The wing-box member 303 is held in a jig position (jig not shown) that supports the wing-box member 303 in a desired operational aerodynamic shape. The modular fixed leading-edge member 301 comprises a leading-edge skin member 305 fixedly attached to at least one leading-edge rib 306. The leading-edge skin 305 member is formed from aluminum sheet and is bonded to an outer facing flange of the leading-edge rib member 306 such that it defines the desired aerodynamic shape of the leading edge region 204 of the wing 103 at the section A-A when it is in the operational position (not yet shown). The leading-edge rib 306 is formed from composite material, however, it may be constructed from any other suitable material means, e.g., milled as a single piece from a billet of aviation grade aluminum alloy. It should be appreciated that the modular leading-edge member 301 is a single unitary assembly and therefore as such it may comprise any number of leading-edge rib members 306 and skin members 305 provided they are an assembly as such.

The leading-edge rib 306 defines an inner concave portion 307 that extends in a direction substantially parallel to the aircraft vertical axis (z) at a lower portion and extends in a direction substantially parallel to the aircraft longitudinal axis (x) at an upper portion. The lower portion of the leading-edge rib 306 terminates in an aft extending flange 309. The upper portion of the leading-edge rib 306 terminates in an aft extending clevis 311. The clevis 311 may alternatively be a single lug element known as a tang. The leading-edge rib 306 also comprises an upper portion that forms a cavity 312 between the leading-edge skin 305 and the rib 306 in the region of the clevis 311. The leading-edge skin 305 in the area of the cavity 312, which is the rearmost portion 313 of the leading-edge skin 305, tends inwards towards the clevis 311 when in an unstressed state, as is the case in the first installation position shown. In an operational position, the desired position of the rearmost portion 313 relative to the rest of the leading-edge skin 305 is shown by line 315. A spanwise stiffening element 316 is attached to the lower surface of the rearmost portion might. The stiffening element 316 provides additional strength and stiffness to the rearmost skin portion 313 between leading-edge rib member 306 in the modular assembly in order to reduce skin deformation when in the airfoil structure is subjected operational aerodynamic loading.

The wing-box member 303 comprises a single piece composite front spar web 317, upper cover 319 and lower cover 321. The upper cover 319 and lower cover 321 define the outermost aerodynamic surfaces of the wing-box member 303. The front spar web 317 extends between the upper cover 319 and lower cover 321 and defines the spar minor axis 113, which extends substantially in the same direction as the aircraft z axis in this example. A lower wing-box flange 323 extends forwards in a first direction of flight and a second direction along the spar major axis 111. An upper recess 325 is defined by the forwardmost portion of the upper cover 319. The aftmost position of the upper recess 325 defines the limit of aerodynamic surface provides by the upper cover 319. Similarly, a lower recess 327 is defined by the forwardmost portion of the outermost surface of wing-box member 303 and the aftmost position of the lower recess 327 defines the limit of aerodynamic surface provides by the lower cover 321. The wing-box member 303 is further provided a bracket that comprises a tang 329. The tang 329 corresponds in dimensions to the clevis 311 and is configured to fit between the clevis 311 when the modular leading-edge member 301 is installed to the wing-box member 303. Both the tang 329 and clevis 311 each define a bore 331 of the same diameter dimension. Each bore 331 is configured to receive a straight bush 332 with an inner diameter (not shown). Each bush 332 may be manufactured from a corrosion resistant material, e.g., brass or steel. It should be appreciated that the clevis 311 and tang 329 may be provided in reverse, e.g., the clevis 311 could be provided by a bracket on the wing-box 303.

In the present embodiment, the axis of the bore 331 and corresponding bush 332 are concentrically aligned so as to define a pivot axis 333 that is aligned substantially parallel to the major axis 111 (shown FIG. 2) of the front spar web 317.

Figure 4:
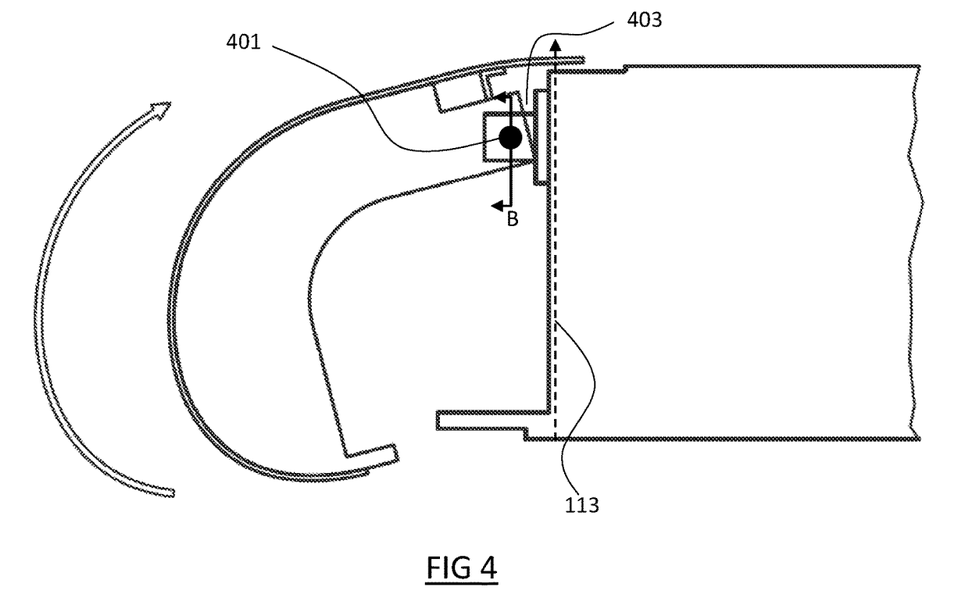
FIG. 4 shows a schematic section view of the airfoil structure of FIG. 3 with a modular fixed leading-edge member 301 installed in a further installation position such that it is pivotable relative to a wing-box 303.

With reference to FIG. 4, a section of the wing 103 shown in FIG. 3 in the leading-edge region is shown in a further installation state, whereby the modular leading-edge member 301 is positioned at an angle relative to the wing-box member 303 such that the inner diameter of the bushes 332 in the tang 329 and clevis 311 are concentrically aligned. A pin 401 corresponding to a close clearance fit with this inner diameter dimension defined by each bush 332 is then inserted to form a pivot joint 403. The use of a pin 401, clevis 311 and tang 329 as a pivot joint 403 is advantageous in that it permits tolerance gaps to be corrected at a single location in a more straightforward manner. How the correction of tolerance gaps can be achieved at a pivot joint 403 is described later in more detail with reference to FIGS. 8 and 9.

In the present embodiment the pin 401 comprises a head at a proximal end and a threaded portion at a distal end that is configured to receive a corresponding threaded torque nut (not shown). When the threaded torque nut is not fully installed, the pivot joint 403 permits 1 degree of rotational freedom about the pivot axis 333 of the modular leading-edge member 301 relative to the wing-box member 303. The rearmost portion 313 of the leading-edge skin 305 may be configured so as not to contact the wing-box member 303 in the further installation state. This may help with insertion of the pin 401 as a pre-tension load of the rearmost portion 313 will not need to be reacted. Once the threaded pin 401 is inserted, the modular fixed leading-edge member 301 is pivoted in the clockwise direction shown around the pivot axis 333 defined by the pivot joint 403 that is provided by the assembly of the clevis 311, tang 329 and threaded pin 401, i.e., the modular leading-edge member 301 would pivot about the pivot joint 403 substantially parallel to a plane formed by the aircraft x axis and the minor axis 113 of the spar web 317. The above-mentioned orientation of the pivot axis 333 is advantageous in that it provides airfoil structure assembly principle that is beneficial for removal of the modular leading-edge assembly 301 when the aircraft 101 is in service. Furthermore, the pin 401 and the pivot joint 403 are predominantly loaded in shear when the airfoil structure 103 is subjected to operational aerodynamic and inertial loading, which is structurally more efficient, thus leading to a lightweight design with a high load bearing capability.

It should be appreciated however that, in some instances, the orientation of airfoil structure, e.g., for the vertical tail airfoil structure 105 and/or assembly principle, e.g., vertical airfoil structure assembly, it may be desirable for the pivot joint 403 to be arranged such that the pivot axis 333 is substantially parallel to a minor axis 113 of the spar web 317, i.e., the modular leading-edge member 301 would pivot about the pivot joint 403 substantially parallel to a plane formed by the aircraft x axis and the major axis 111 of the spar web 317.

Figure 5:
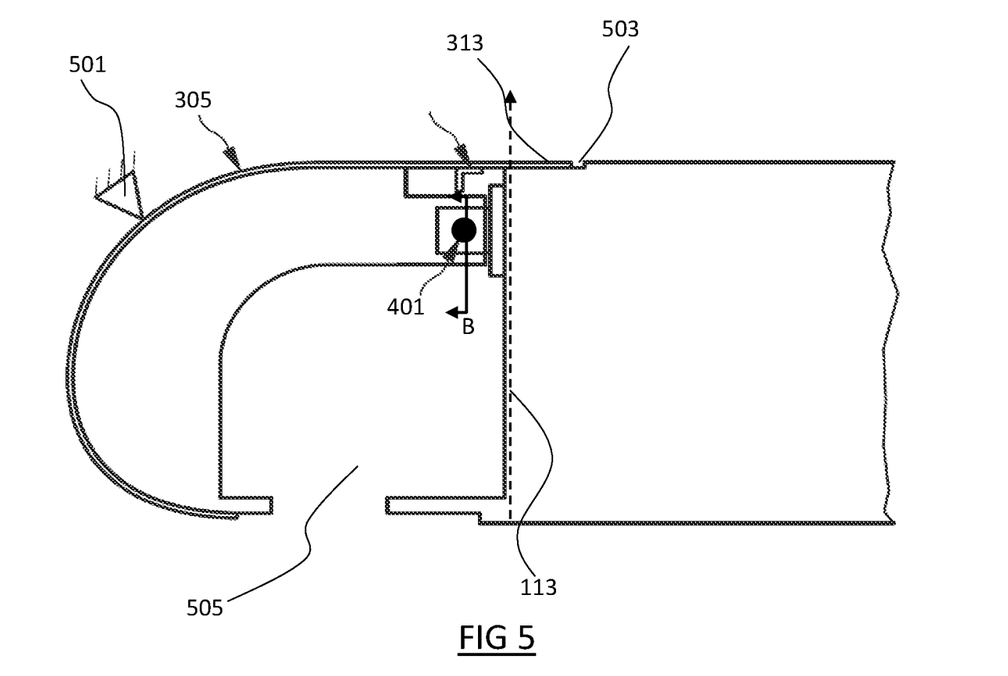
FIG. 5 shows a schematic section view of the airfoil structure of FIG. 3 with a modular fixed leading-edge member 301 fixedly attached in an operational position relative to a wing-box 303.

With reference to FIG. 5, a section of the wing 103 in the leading-edge region is shown in an operational state. Having rotated the modular leading-edge member 301 about the pivot joint 403 to the jig position 501 indicated, a nut is then fully installed at the distal end of the threaded pin 401 and torqued to provide a compression means that is configured to compress the clevis 311 against the tang 329. The applied compression creates sufficient surface frictional forces between the tang 329 and clevis 311 such that it prevents the modular leading-edge member 301 from pivoting (rotating) relative to the wing-box member away from the operational position. In such a state, the modular leading-edge member 301 becomes fixedly attached to the wing-box member 303 at a position corresponding to the jig position 501. This results in an open type of airfoil structure 103 where a gap 505 is provided between the lower region of the modular leading-edge assembly 301 and the wing-box member 303 ahead of the front spar web 317. This gap 505 may be closed to form a continuous outer aerodynamic profile by attaching a removable aerodynamic panel 1001 which is described in more detail later with reference to FIG. 10. It should be noted that the jig position 501 is calibrated to the required operational position of the modular leading-edge member 301 relative to the wing-box member 303 and variations from this jig position 501 between the member 301 and 303 are tolerance gaps that need to be rectified.

The open type of airfoil structure 103 according to the present embodiment may be particularly advantageous where improved levels of accessibility are required to the interior of the airfoil structure 103 for certain spanwise positions or indeed along the entire span. It may also be particularly advantageous where large system equipment components, such as high lift device actuation components, need to be accommodated within the airfoil structure 103.

The attachment of the modular leading-edge member 301 to the wing-box member 303 in the above prescribed manner avoids the use of any buttstrap attachment of leading-edge and/or trailing-edge structural members. Seeing as the clearance between the pin 401, clevis 311 and tang 329 are more adaptable than, for example, buttstraps, it should be considered that the use of a pivot joint 403 therefore permits a type of connection of two unitary members that accommodates rectification large tolerance gaps in a straightforward manner. Furthermore, if tolerance gaps are identified between the modular leading-edge member 301 and the wing-box member 303, then the pivot joint 403 can be disassembled in order to adjust the connection much more easily than, for example, using a buttstrap member that requires repositioning of the member 301 and 303 if a tolerance gap needs to be rectified. Therefore, an airfoil structure 103 is provided that is easier and less time consuming to assemble.

During rotation of the modular leading-edge member 301, the rearmost portion 313 of the leading-edge skin 305 bears against the recess 325, and deforms to a pre-stressed state indicated by the line 315, such that the rearmost portion 313 substantially conforms to the recess 325. This is advantageous as it provides a simpler assembly and interface of the leading-edge skin 305 with upper cover 319, with no need for drilling and bolting to a buttstrap in multiple spanwise positions. This also results in a precisely controlled overlap of the modular leading-edge skin 305 with the upper cover 319 that reduces, as much as possible, physical steps in the outer aerodynamic shape between the members 301 and 303. In consideration of the above, this aspect of the airfoil structure 103 design is particularly advantageous for airfoil structures where laminar aerodynamic flow properties are desired.

Figure 6:
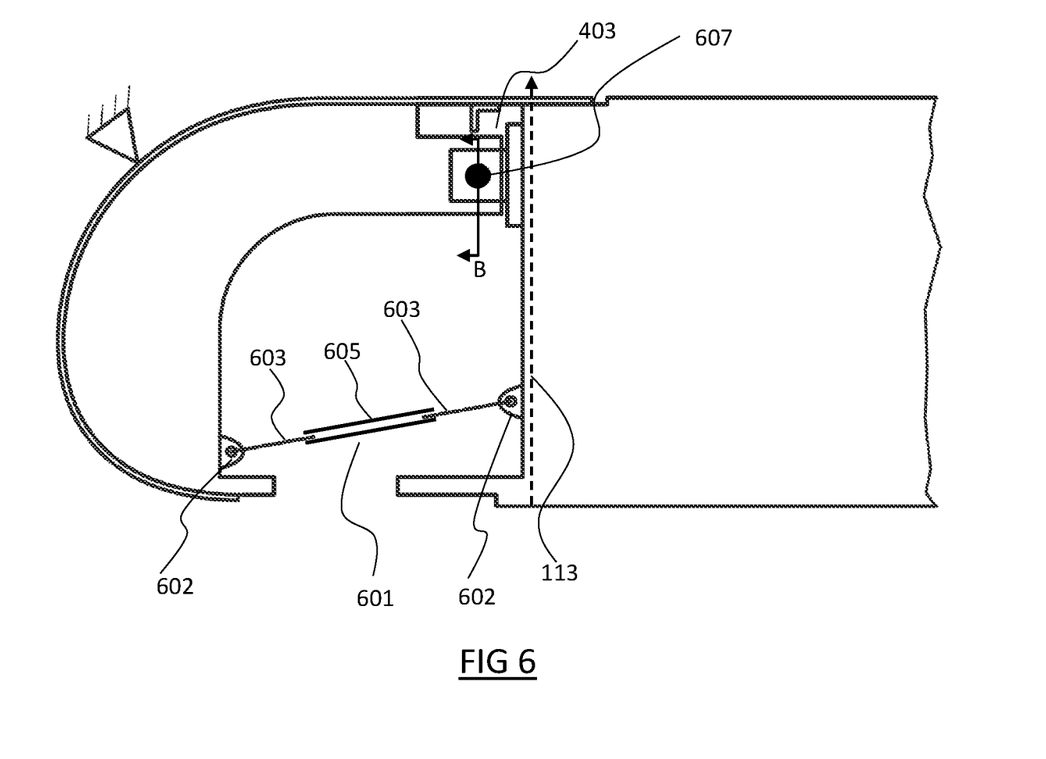
FIG. 6 shows a schematic section view of the airfoil structure of FIG. 3 according to another embodiment of the present invention.

With reference to FIG. 6, another embodiment of the present invention substantially the same as that of FIG. 5 is provided, with the exception that compression induced friction forces between the clevis 311 and tang 329 of the pivot joint are not used to prevent rotation of the modular leading-edge member 301 relative to the wing-box member 303. Instead, a connection member 601 is used separately from the pivot joint to prevent the modular leading-edge member 301 from pivoting relative to the wing-box member 303 away from the operational position. The connection member 601 fixedly attaches the modular leading-edge member 301 to the wing-box member 303. As the connection member 601 will transfer loads, it may allow for the pivot joint 403 to be sized to a lower load level, therefore reducing the size, weight and complexity of the pivot joint 403.

The connection member 601 may be in the form of an adjustable strut comprising a cylinder 605 formed of a metallic material that has a threaded inner surface that is threadably engaged with a pair of threaded rod ends 603. At least one rod end is required. A first rod end 603 is hingedly connected to a corresponding lug 602 formed by the leading-edge rib 306. A second rod end 603 is also connected in a similar manner to a lug 602 formed by the spar web 317. The rod ends 603 are threaded in a direction opposite to one another, so that rotation of the cylinder portion in one direction increases the length of the connection member 601 and decreases the length in another. The use of an adjustable strut as the connection member 601 may be used advantageously to make small adjustments to the position of the modular leading-edge member 301 relative to the wing-box 303 about the pivot joint 403. In such a way, it may be used to compensate for tolerance gaps or make relatively small adjustments of the position of the modular leading-edge member 301 relative to the wing-box member 303. Alternatively, the connection member 601 may be in the form of a non-adjustable strut. The strut may be in the form of a solid rod.

The connection member 601 may be placed as far as possible from the pin 607 and in an orientation that allows the connection member 601 to be principally loaded in tension and/or compression (if the pivot joint 403 were to exist between the lower portions of the modular leading-edge member 301 and wing-box member 303). The present embodiment may be advantageous because the orientation of the connection member 601 is adaptable due the positioning of the lugs 602. This means the orientation of the connection member 601 can be suited to the principal load direction requirements, which may vary along the span of the airfoil structure 103.

A further difference in the present embodiment to that of FIG. 5 is the use of a different type of pin 607 in the pivot joint 403. The pin 607 comprises a smooth shank extending along the majority of the length of the pin 607. The pin 607 is configured to allow 1 rotational degree of freedom about the bore 331 in the clevis 311 and tang 329, but is not configured to compress the pivot joint when fully installed. One end of the pin 607 has a head that rests against the clevis 311 (or an underlying spacer) when installed. The pin 607 is secured in place between the clevis 311 and tang 329 using a split pin secured in a castellated nut attached at its other end. The use of a split pin arrangement allows for the pin 607 to be quickly secured in the pivot joint 403.

Figure 7:
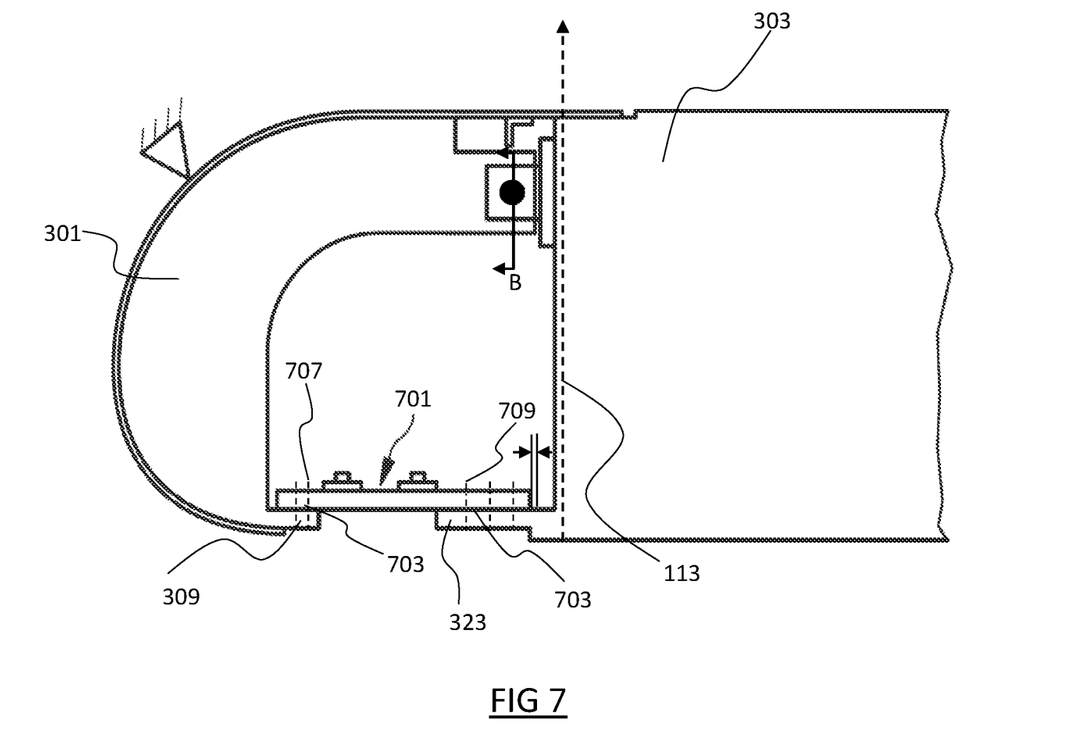
FIG. 7 shows a schematic section view of the airfoil structure of FIG. 3 according to a further embodiment of the present invention.

With reference to FIG. 7, an alternative embodiment of the present invention is provided that is substantially the same as that shown FIG. 6, with the exception that a connection member 701 is formed from a rod of substantially rectangular or circular cross-section machined from an aviation grade aluminum alloy material. For higher load applications or to ensure material compatibility, titanium alloy or corrosion resistant steel material may be used. Such a connection member 701 may be more suitable in circumstances where higher principal loads are expected to be carried by the connection member 701 between the modular leading-edge member 301 and the wing-box member. Similar to the previous embodiment of FIG. 6, the connection member 701 is also used as a means to prevent the modular leading-edge member 301 from pivoting relative to the wing-box member 303 about the pivot joint 403 away from the operational position.

Lap joints 703 connect each respective end of the connection member 701 to the modular leading-edge member 301 and the wing-box member 303, respectively. At the forward end, the lap joint 703 is formed by the connection member 701 that is mechanically fastened by a plurality of threaded fasteners 707 to the aft extending flange 309 of the modular leading-edge member 301. At the aft end, the lap joint 703 is formed by the connection member 701 mechanically fastened by a plurality of threaded fasteners 709 to the lower wing-box flange 323 of the wing-box member 303. The overlap in the lap joint 703 may be configured such that the length of the connection member 701 between mechanical fastened positions can be adjusted in order to compensate for tolerance gaps, which is advantageous for the reasons previously stated.

Figure 8:
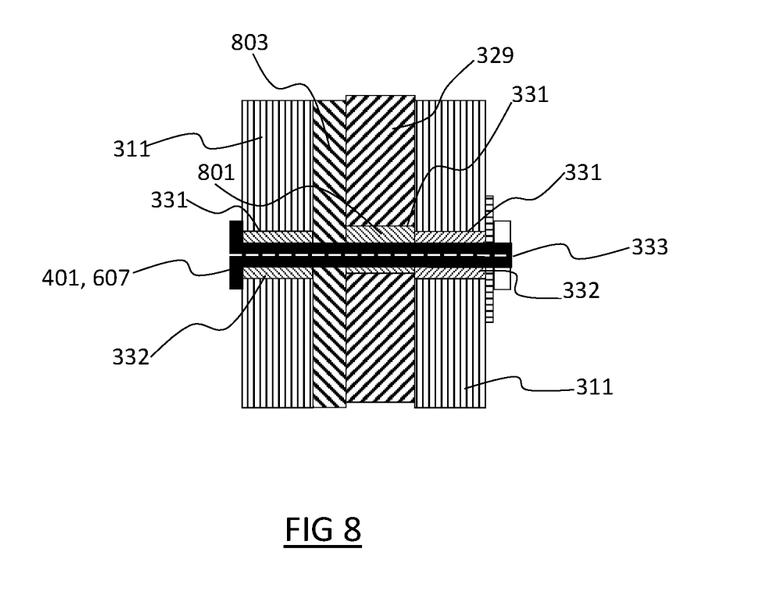
FIG. 8 shows a schematic cross section B-B of the pivot joint of FIGS. 4-7 according to an embodiment of the present invention.

With reference to FIG. 8, an alternative embodiment applicable to any of the previously mentioned embodiments is provided. The interface between the clevis 311, tang 329 and pins 401 or 607 may be adjustable to remove manufacturing or assembly tolerance gaps by using one or more linear compensators 801 in the pivot joint 403. This is particularly advantageous for using in airfoil structures 103 predominantly formed from composite materials where linear tolerance gaps in the order of +−10 mm between parts may need to be corrected.

In the present embodiment, an eccentric bush 801 is used as a linear compensator to compensate for a combined linear tolerance gap substantially in the x and z direction between the modular leading-edge member 301 and the wing-box member 303. A further linear compensator 803, formed from a substantially flat brass plate material of specified dimensions, is also used to compensate for a single linear tolerance gap in the direction of the spar major axis 111 between the modular leading-edge member 301 and the wing-box member 303. It should be appreciated that any suitable alternative to the above types of linear compensator may be used, e.g., an eccentric bolt/washer combination may be used instead of an eccentric bush.

Figure 9:
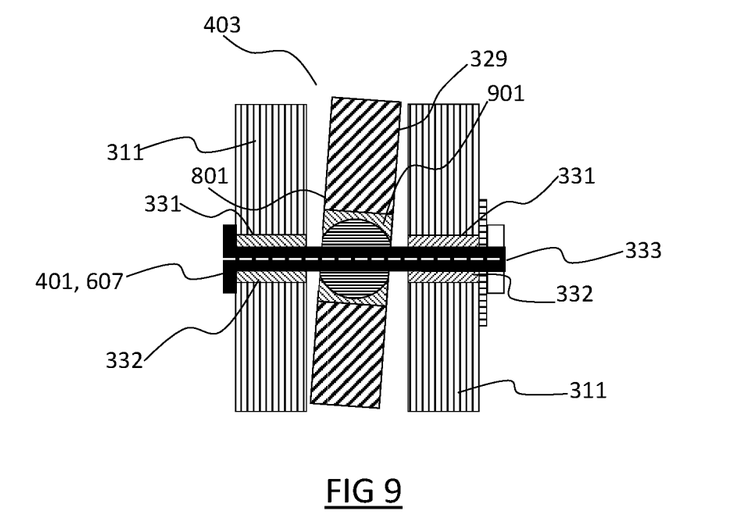
FIG. 9 shows a schematic cross section B-B of the pivot joint of FIGS. 4-7 according to an alternative embodiment of the present invention.

With reference to FIG. 9, yet a further alternative embodiment applicable to any of the previously mentioned embodiments is provided. The interface between the clevis 311, tang 329 and pins 401, 607 (depending on the chosen type) may be adjustable to remove angular tolerance gaps by using one or more angular compensators 901 in pivot joint 403. This is particularly advantageous for using in airfoil structures 103 predominantly formed from composite materials where angular tolerance gaps in the order of +/−1 to +/−1.5 degrees between parts may need to be corrected. In the present embodiment, a spherical bearing replaces the bush 332 normally installed in the tang 329 and acts as an angular compensator 901 to compensate for an angular tolerance gap between the modular leading-edge member 301 and the wing-box member 303 at the location of the tang 329. It should be appreciated that any suitable alternative to the above types of angular compensator may be used, e.g., a set of spherical washers may be used instead and may be installed at each side of the tang 329 between the clevis 311. While the loading bearing capability of spherical washers is lower than that of a spherical bearing, they may be suitable for lower loaded applications and they are generally cheaper than spherical bearings. Furthermore, they may be easier to install in the pivot joint 403, even with the pin 401 removed and the tang 329 and clevis 311 held in an installed position.

Figure 10:
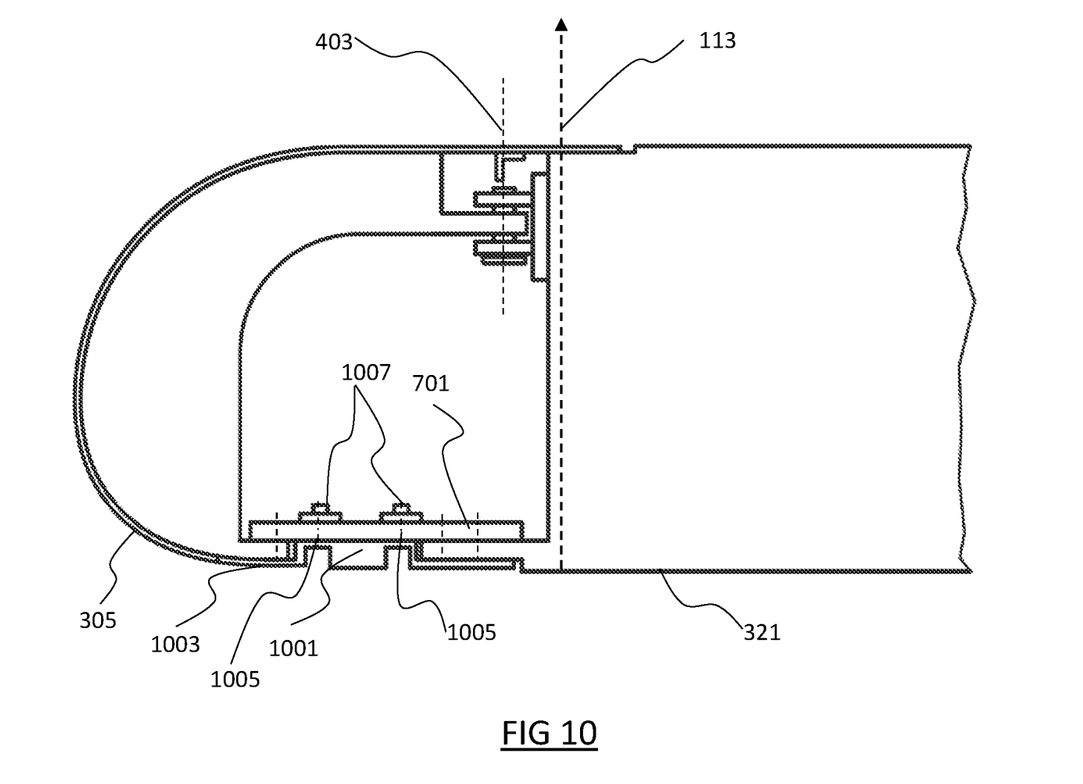
FIG. 10 shows the airfoil structure of FIG. 3 according to a further embodiment of the present invention.

With reference to FIG. 10, a further embodiment of the present invention is shown that is applicable to any of the embodiments so far described. An aerodynamic panel 1001 is shown positioned between the lower surfaces of the modular leading-edge member 301 and the wing-box member 303. The outermost surface 1003 aerodynamic panel 1001 aligns with the outermost surface of airfoil structure 103 such that a smooth aerodynamic outer surface is achieved. The aerodynamic panel 1001 is formed of a stiff carbon fiber reinforced composite material however it may be formed from any other equivalent material, e.g., aluminum alloy. The aerodynamic panel 1001 is removably secured to the connection member 701 by means of a plurality of close fit mechanical fasteners 1005 that are threadably engaged with a corresponding set of captivated anchor nuts 1007 attached to an interior surface of the connection member 701. The use of captivated anchor nuts allows for a panel 1001 that is interchangeable and can be installed and replaced quickly during assembly or in-service. The aerodynamic panel 1001 may also be secured by mechanical fasteners in the same manner to the aft extending flange 309 and the lower wing-box flange 323. It should be appreciated that the fairing 1001 may also be secured to a plurality of connection members 701 extending in a spanwise dimension.

Figure 11:
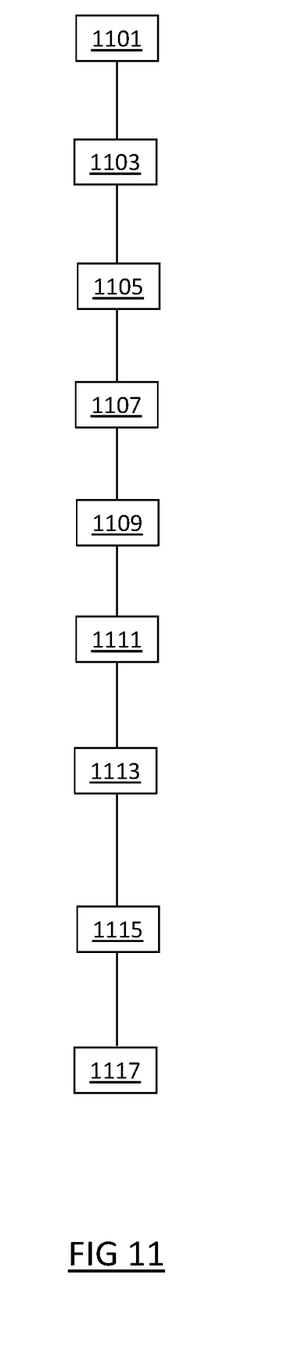
FIG. 11 shows a diagram for a method of assembling an airfoil structure according to embodiments of the present invention.

With reference to FIG. 11, a method of assembling an airfoil structure 103 comprises the steps of 1101—providing a torsion-box member 303 comprising a spar web 317 and a upper cover panel 319, 1103—providing a leading-edge member or trailing-edge member 301, 1105—positioning the leading-edge member or trailing-edge member 301 at an installation position adjacent to the torsion-box member 303 at the location of a pivot joint 403; 1107—connecting the leading-edge member or trailing-edge member 301 to the torsion-box member 303 at the pivot joint 403; 1109—rotating the leading-edge member or trailing-edge member 301 about the pivot joint 403 to an operational position; and, 1111—fixing the leading-edge member or trailing-edge member 301 in the operational position. Optionally, the method of assembly may include the steps of 1113—providing a connection member 601, 701, and 1115—fixedly connecting the connection member 601, 701 to the leading-edge member, or the trailing-edge member 301, and the torsion-box member 303 so as to prevent the leading-edge member, or trailing-edge member 301, from pivoting relative to the torsion-box member 303 away from the operational position. Further the method of assembly may optionally include the step of 1117—rotating the leading-edge member, or trailing-edge member 301, relative to the torsion-box member 303 by adjusting the length of the connection member 601, 701 in order to compensate for an angular tolerance gap.

Figure 12:
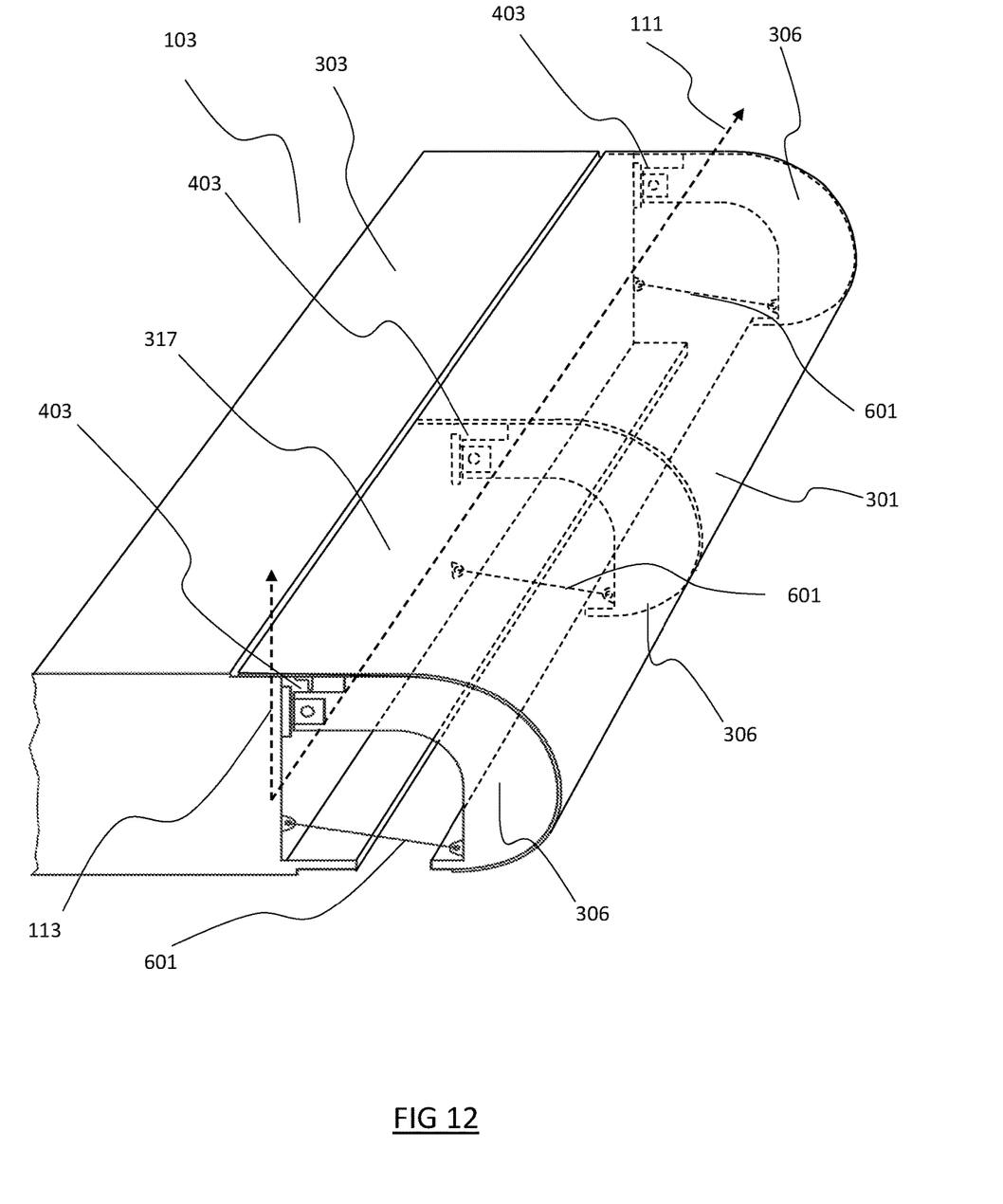
FIG. 12 shows a schematic isometric view of an airfoil structure according to a further embodiment of the present invention.

While all of the embodiments previously discussed describe to a modular leading-edge member 301 connected to a wing-box member at a single pivot joint 403, it should be appreciated that more than one of any combination of the pivot joints shown in FIGS. 5,6 and 10 may be provided for a given modular leading-edge member 301. By way of example with reference to FIG. 12, a pivot joint 403 may be provided by a clevis 311 pin or tang 329 arrangement (not shown) at each leading-edge rib 306 position between the modular leading-edge member 301 and the wing-box member 303. Furthermore, each pivot joint 403 may comprise linear compensators 801 and/or angular compensators 901 that may or may not be pre-attached (not shown) substantially in accordance with FIGS. 8 and 9. Pre-attachment may be particularly desirable where tolerance gaps are predetermined in the airfoil structure 103 prior to assembly.

Where in the foregoing description, integers or members are mentioned which have known, obvious or foreseeable equivalents; then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, while of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An airfoil structure comprising:
a torsion-box member with an upper cover and a lower cover joined by an upstanding spar web therebetween, wherein the upstanding spar web is connected by at least one pivot joint located along the upstanding spar web between the upper cover and the lower cover to a leading-edge member or a trailing-edge member, wherein the leading-edge member or the trailing-edge member are fixed such that the leading-edge member or the trailing-edge member are not moveable during operation of the aircraft, and
wherein the pivot joint permits rotation of the leading-edge member, or the trailing-edge member, relative to the torsion-box member between an installation position and a fixed, non-pivotable aircraft operational position, wherein the pivot joint comprises a pivot axis substantially parallel to a major axis of the upstanding spar web.

2. The airfoil structure according to claim 1, wherein the pivot joint further comprises a linear compensator to compensate for a linear tolerance gap between the torsion-box member and the leading-edge member or the trailing-edge member at the pivot joint.

3. The airfoil structure according to claim 1, wherein the leading-edge member, or the trailing-edge member or torsion-box member is of a modular design.

4. The airfoil structure according to claim 1, further comprising an interchangeable aerodynamic panel positioned between lower surfaces of the leading-edge member and the torsion-box member.

5. The airfoil structure according to claim 4 wherein the interchangeable aerodynamic panel is removably attached to a connection member.

6. The airfoil structure according to claim 1, wherein the pivot joint comprises a clevis, a corresponding tang, and a pin.

7. The airfoil structure according to claim 6, wherein the pivot joint further comprises compression means configured to compress the clevis and tang such that the leading-edge member, or the trailing-edge member, can be prevented from pivoting relative to the torsion-box member away from the operational position.

8. The airfoil structure according to claim 1, wherein the pivot joint further comprises an angular compensator configured to compensate for an angular tolerance gap between the torsion-box member and the leading-edge member or the trailing-edge member at the pivot joint.

9. The airfoil structure according to claim 8, wherein the angular compensator comprises a spherical bearing.

10. The airfoil structure according to claim 8, wherein the angular compensator comprises one or more spherical washers.

11. The airfoil structure according to claim 1, further comprising a connection member configured to connect the leading-edge member, or the trailing-edge member, to the torsion-box member, such that the connecting member prevents the leading-edge member, or the trailing-edge member, from pivoting relative to the torsion-box member away from the operational position.

12. The airfoil structure according to claim 11, wherein at least one end of the connection member is configured to connect to the leading-edge member or the trailing-edge member or the torsion-box member using a lap joint.

13. The airfoil structure according to claim 11, wherein at least one end of the connection member is configured to hingedly connect to the leading-edge member or the trailing-edge member or the torsion-box member.

14. The airfoil structure according to claim 11, wherein a length of the connection member is adjustable such that rotation of the leading-edge member, or the trailing-edge member, relative to the torsion-box member can be adjusted to compensate for a tolerance gap.

15. An aircraft comprising the airfoil structure according to claim 1.

16. An airfoil structure comprising:
a torsion-box member with an upper cover and a lower cover joined by a front-facing, upstanding spar web therebetween, wherein the front-facing, upstanding spar web is connected by at least one pivot joint located along the front-facing, upstanding spar web between the upper cover and the lower cover to a leading-edge member or a trailing-edge member, wherein the leading-edge member or the trailing-edge member are fixed such that the leading-edge member or the trailing-edge member are not moveable during operation of the aircraft, and
wherein the pivot joint permits rotation of the leading-edge member, or the trailing-edge member, relative to the torsion-box member between an installation position and a fixed, non-pivotable aircraft operational position, wherein the pivot joint comprises a pivot axis substantially parallel to a minor axis of the front-facing, upstanding spar web.

17. A method of assembling an airfoil structure, comprising:
providing a torsion-box member comprising an upstanding spar web joining an upper cover panel to a lower cover panel;
providing a leading-edge member or a trailing-edge member;
positioning the leading-edge member or the trailing-edge member at an installation position adjacent to the torsion-box member at a location of a pivot joint located along the upstanding spar web between the upper cover panel and the lower cover panel;
connecting the leading-edge member or the trailing-edge member to the upstanding spar web of the torsion-box member at the pivot joint;
rotating the leading-edge member or the trailing-edge member about the pivot joint to an operational position, wherein the pivot joint comprises a pivot axis substantially parallel to a major axis of the upstanding spar web; and,
fixing the leading-edge member or the trailing-edge member in the operational position, wherein the leading-edge member or the trailing-edge member assumes a fixed, non-pivotable configuration in the aircraft operational position.

18. The method according to claim 17, further comprising the steps of
providing a connection member; and,
fixedly connecting the connection member to the leading-edge member, or the trailing-edge member, and the torsion-box member so as to prevent the leading-edge member, or the trailing-edge member, from pivoting relative to the torsion-box member away from the operational position.

19. The method according to claim 18, further comprising the step of:
rotating the leading-edge member, or the trailing-edge member, relative to the torsion-box member by adjusting a length of the connection member to compensate for a tolerance gap.

* * * * *